(12) United States Patent
Moon

(10) Patent No.: US 6,326,833 B1
(45) Date of Patent: Dec. 4, 2001

(54) HIGHLY EFFECTIVE CHARGE PUMP EMPLOYING NMOS TRANSISTORS

(75) Inventor: Byung-sick Moon, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/430,365

(22) Filed: Oct. 28, 1999

(30) Foreign Application Priority Data

Dec. 3, 1998 (KR) .................................................. 98-52859

(51) Int. Cl.[7] ........................................................ G05F 1/10
(52) U.S. Cl. ............................................................... 327/536
(58) Field of Search ........................... 327/389, 390, 327/534, 535, 536

(56) References Cited

U.S. PATENT DOCUMENTS

| | | | |
|---|---|---|---|
| 5,408,140 | * 4/1995 | Kawai et al. | 327/536 |
| 5,701,096 | * 12/1997 | Higashiho | 327/536 |
| 5,774,012 | * 6/1998 | Im | 327/536 |
| 5,861,772 | * 1/1999 | Lee | 327/589 |
| 6,055,193 | * 4/2000 | Manning et al. | 365/189.11 |

\* cited by examiner

*Primary Examiner*—Jeffrey Zweizig
(74) *Attorney, Agent, or Firm*—Skjerven Morrill MacPherson LLP; David W. Heid

(57) ABSTRACT

A highly effective charge pump circuit includes a pulse generator for generating a pulse signal in response to a control signal, a first voltage pumping unit for generating a first high voltage in response to the control signal and the pulse signal, a second voltage pumping unit for generating a second high voltage of the same level as the first high voltage in response to the control signal and the pulse signal, and a voltage transmitting unit that receives and outputs first high voltage when the second high voltage is applied. The charge pump obtains a high voltage using NMOS transistors.

17 Claims, 3 Drawing Sheets

HIGHLY EFFECTIVE CHARGE PUMP EMPLOYING NMOS TRANSISTORS

BACKGROUND OF THE INVENTION

1. Field of the Invention

The present invention relates to an electric circuit, and more particularly, to a charge pump for generating a high voltage required for an internal circuit of a semiconductor memory device.

2. Description of the Related Art

As the need for larger dynamic random access memory (DRAM) integrated circuits (ICs) increases, the integration of the DRAM IC increases, and the amount of control circuitry required on the DRAM increases. Accordingly, the DRAM ICs consume more power. When such semiconductor memory devices are in portable systems, the devices consume a large amount of power and quickly drain the batteries of the portable systems. Accordingly, the increasing integration of semiconductor memories shortens the time for which the portable system can operate. In response, the supply voltage of semiconductor memory devices has been decreased to decrease power consumption. For example, in the past, semiconductor memory devices had a supply voltage of 5.0 volts. However, more recent semiconductor memory devices use a supply voltage of 3.3 volts, and development of devices having supply voltages lower than 3.3 volts is continuing.

A Metal oxide semiconductor (MOS) transistors are common in semiconductor memory devices. When the supply voltage passes through an n-channel MOS (or NMOS) transistor, the voltage drops. More specifically, when the supply voltage is applied to the drain and the gate of an NMOS transistor, the resulting source voltage is less than the supply voltage by the threshold voltage of the NMOS transistor. Using a gate voltage that is higher than the supply voltage can keep the gate-to-source voltage equal to the threshold voltage of the NMOS transistor and provide a source voltage equal to the supply voltage.

In general, charge pumps include a plurality of MOS transistors for generating and transmitting a high voltage. It is possible to obtain a higher voltage from the charge pumps by reducing the loss of voltage due to the threshold voltage of the MOS transistors in transmitting the high voltage. However, efficient charge pump circuits are sought and are essential for semiconductor memory devices that operate at voltages at or below 2.5 volts.

SUMMARY OF THE INVENTION

In accordance with an aspect of the present invention, a charge pump circuit generates a higher voltage by reducing the loss due to the threshold voltage of MOS transistors. The charge pump circuit can be employed in a semiconductor memory device for generating a high voltage from a low power supply voltage.

A charge pump circuit according to an embodiment of the present invention includes a pulse generator, a first voltage pumping unit, a second voltage pumping unit, and a voltage transmitting unit. The pulse generator generates a pulse signal in response to an external control signal. The first voltage pumping unit generates a first high voltage of a predetermined level in response to the control signal and the pulse signal. The second voltage pumping unit generates a second high voltage of the same level as the first high voltage in response to the control signal and the pulse signal. The voltage transmitting unit receives the first high voltage and outputs the first high voltage when the second high voltage is applied.

The pulse generator preferably generates a logic low level pulse signal when the control signal toggles from a first level to a second level.

The first voltage pumping unit preferably generates a third high voltage when the pulse signal is generated and the first high voltage, which is higher than the third high voltage, immediately after the pulse signal has disappeared. The second voltage pumping unit preferably generates a fourth high voltage when the pulse signal is generated and the second high voltage, which is higher than the fourth high voltage, immediately after the pulse signal has disappeared.

According to the present invention, it is possible to obtain a high voltage without the voltage drop due to the threshold voltage of an NMOS transistor.

BRIEF DESCRIPTION OF THE DRAWINGS

The above features and advantages of the present invention will become more apparent in view of the following description when taken with reference to the attached drawings in which.

Use of the same reference symbols in different figures indicates similar or identical items.

DESCRIPTION OF THE PREFERRED EMBODIMENTS

Figure 1:
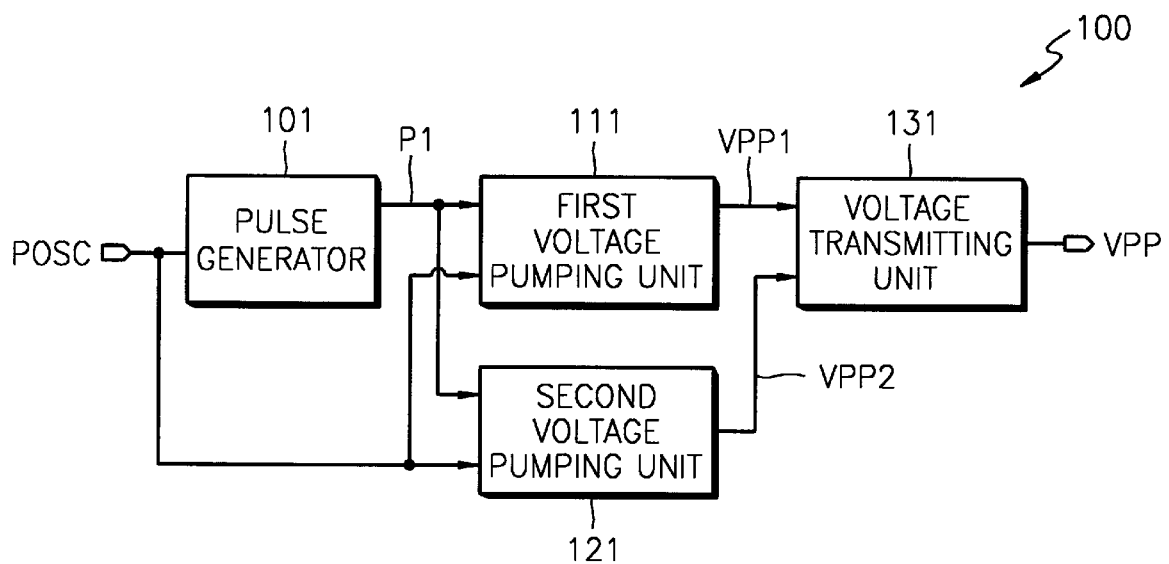
FIG. 1 is a block diagram of a charge pump circuit in accordance with an embodiment of present invention.

Hereinafter, an exemplary embodiment of the present invention is described in reference to the attached drawings. FIG. 1 is a block diagram of a charge pump circuit 100 in accordance with an embodiment of the present invention. Referring to FIG. 1, charge pump circuit 100 includes a pulse generator 101, a first voltage pumping unit 111, a second voltage pumping unit 121, and a voltage transmitting unit 131.

The pulse generator 101 generates a pulse signal P1 in response to a control signal POSC inputted from outside charge pump circuit 100. Signal POSC may be, for example, from other circuitry (not shown) in an integrated circuit containing charge pump circuit 100 or from outside the integrated circuit. The control signal POSC remains at a first level, i.e., a logic low in a stand-by state, and toggles to a second level, i.e., a logic high, to cause charge pump circuit 100 to generate a voltage VPP higher than a power voltage Vdd. The pulse signal P1 remains at the second level, i.e., logic high, when the control signal POSC is logic low. Pulse signal P1 transits to the first level, i.e., logic low, when the control signal POSC toggles from the logic low level to the logic high level, and then after a delay, pulse signal P1 transits back to the second level.

The first voltage pumping unit 111 generates a first high voltage VPP1 in response to the pulse signal P1 and the control signal POSC. The first high voltage VPP1 is only slightly affected by the threshold voltage of the MOS transistor and is much higher than the power supply voltage Vdd provided to charge pump circuit 100.

The second voltage pumping unit 121 generates a second high voltage VPP2 in response to the pulse signal P1 and the control signal POSC. The second high voltage VPP2 is the same as the first high voltage VPP1.

The voltage transmitting unit 131 receives the first high voltage VPP1 and the second high voltage VPP2 and generates the high voltage VPP which is output from charge pump circuit 100. The high voltage VPP is also at the same voltage as the first high voltage VPP1.

Figure 2:
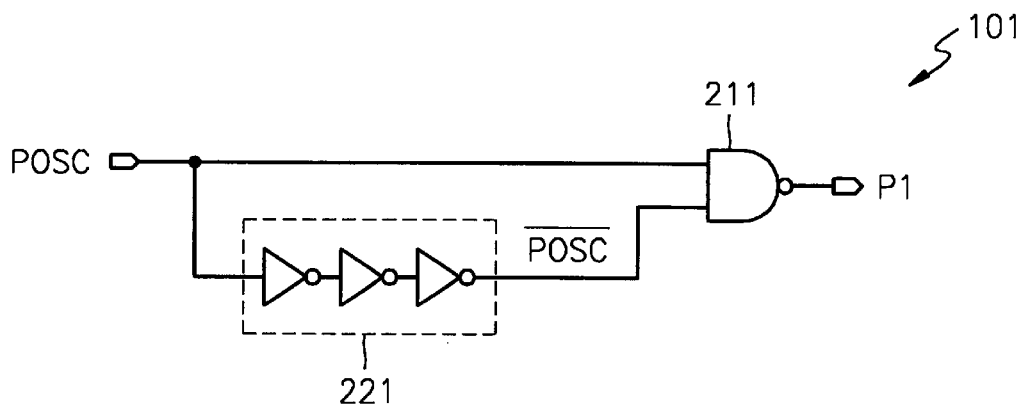
FIG. 2 is a circuit diagram of the pulse generator shown in FIG. 1.

FIG. 2 is a circuit diagram of the pulse generator 101 shown in FIG. 1. Referring to FIG. 2, pulse generator 101 includes a NAND gate 211 and an inverter chain 221. In FIG. 2, inverter chain 221 includes three inverters, however, inverter chain 221 can alternatively include any odd-number of inverters. Inverter chain 221 outputs a signal $\overline{POSC}$ obtained by delaying and inverting control signal POSC. The number of the inverters included in inverter chain 221 determines the delay time. Namely, as more inverters are included in the inverter chain 221, the delay becomes longer. The predetermined delay time is equal to the time for which the pulse signal P1 remains at logic low level in response to a low-to-high transition in the control signal POSC.

After control signal POSC remains at a logic low level for at least the delay time, output signal $\overline{POSC}$ of inverter chain 221 is at a logic high level. In response control signal POSC being at the logic low level, NAND gate 211 generates a logic high level for output signal P1 regardless of output signal $\overline{POSC}$ of inverter chain 221. When control signal POSC toggles to a logic high level, the output signal P1 from NAND gate 211 toggles from the logic high level to the logic low level. After the predetermined delay time passes, output signal $\overline{POSC}$ from inverter chain 221 toggles from the logic high level to a logic low level. Accordingly, output signal P1 from NAND gate 211 toggles back to the logic high value. Therefore, pulse generator 101 generates a logic low level pulse that remains for the predetermined time (T2-T1 of FIG. 6).

Figure 3:
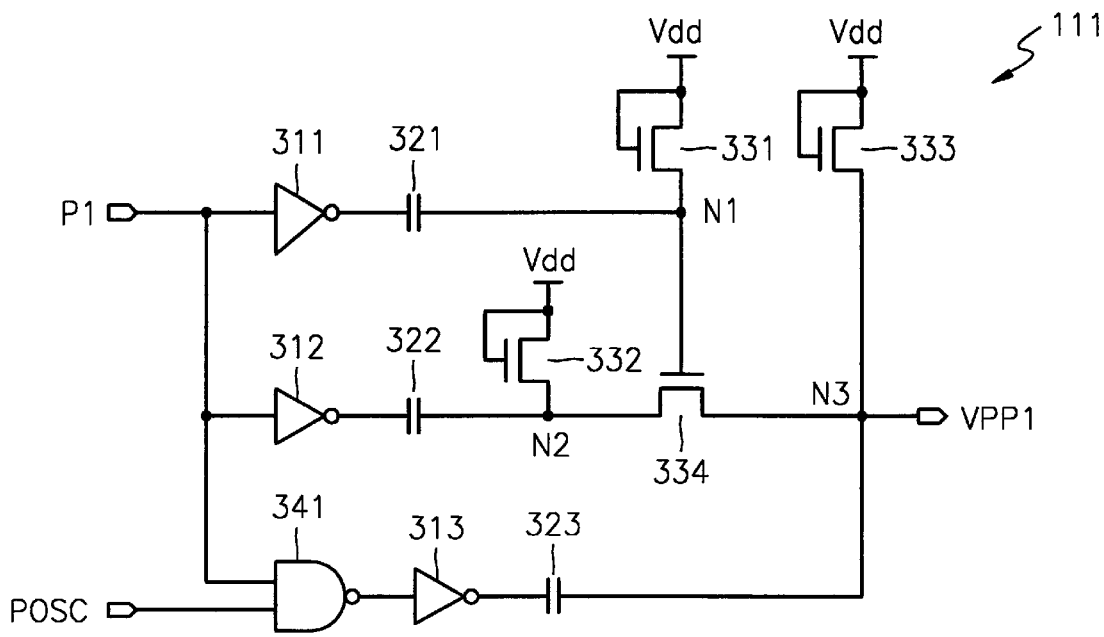
FIG. 3 it diagram of the first voltage pumping unit shown in FIG. 1.

FIG. 3 is a circuit diagram of the first voltage pumping unit 111 shown in FIG. 1. Referring to FIG. 3, the first voltage pumping unit 111 includes inverters 311 through 313, capacitors 321 through 323, NMOS transistors 331 through 334, and a NAND gate 341. Each of NMOS transistors 331 through 333 has a drain coupled to supply voltage Vdd and a gate connected to its drain so that each of the NMOS transistors 331 through 333 operates as a diode. Accordingly, each of the NMOS transistors 331 through 333 provides at its source a precharge voltage Vdd−Vtn obtained by subtracting the transistor's threshold voltage Vtn from the supply voltage Vdd.

First voltage pumping unit 111 generates the first high voltage VPP1 in response to signals P1 and POSC. When the pulse generator 101 maintains the signal P1 in a logic high (or stand-by) state, inverters 311 and 312 maintain output signals at the logic low levels and do not charge capacitors 321 and 322. Transistors 331 and 33 respectively charge nodes N1 and N2 to the precharge voltage Vdd−Vtn. Also, since control signal POSC is at the logic low level in the stand-by state, the output signal from inverter 313 is at the logic low level. Accordingly, inverter 313 does not charge capacitor 323, and transistor 333 charges node N3 to the precharge voltage Vdd−Vtn.

When pulse generator 101 generates a logic low level pulse causing signal P1 to toggle to the logic low level, the output signals from inverters 311 and 312 rise to the logic high level. Accordingly, inverters 311 and 312 charge capacitors 321 and 322 to the supply voltage Vdd. Node voltages VN1 and VN2 at nodes N1 and N2 correspondingly rise to 2Vdd−Vtn. Since the node voltage VN1 of 2Vdd−Vtn is applied to the gate of NMOS transistor 334, transistor 334 transmits the node voltage VN2 to node N3, and the first high voltage VPP1 rises from the precharge voltage Vdd−Vtn to 2Vdd−2Vtn. Since NAND gate 341 outputs a logic high level when pulse signal P1 is at the logic low level, inverter 313 does not charge capacitor 323 when transistor 334 transfers the voltage VN2 from node N2 to node N3.

When pulse signal P1 toggles from the logic low level back to the logic high level, capacitors 321 and 322 discharge to respective inverters 311 and 312 since the output voltages of inverters 311 and 312 drop to the logic low level. Since control signal POSC is at the logic high level when output signal P1 from pulse generator 101 toggles from the logic low level to the logic high level, the output signal from NAND gate 341 toggles to a logic low level. Therefore, inverter 313 outputs a logic high level and charges capacitor 323 to supply voltage Vdd. In response, the voltage VPPI at node N3 rises from 2Vdd−2Vtn to 3Vdd−2Vtn.

Figure 4:
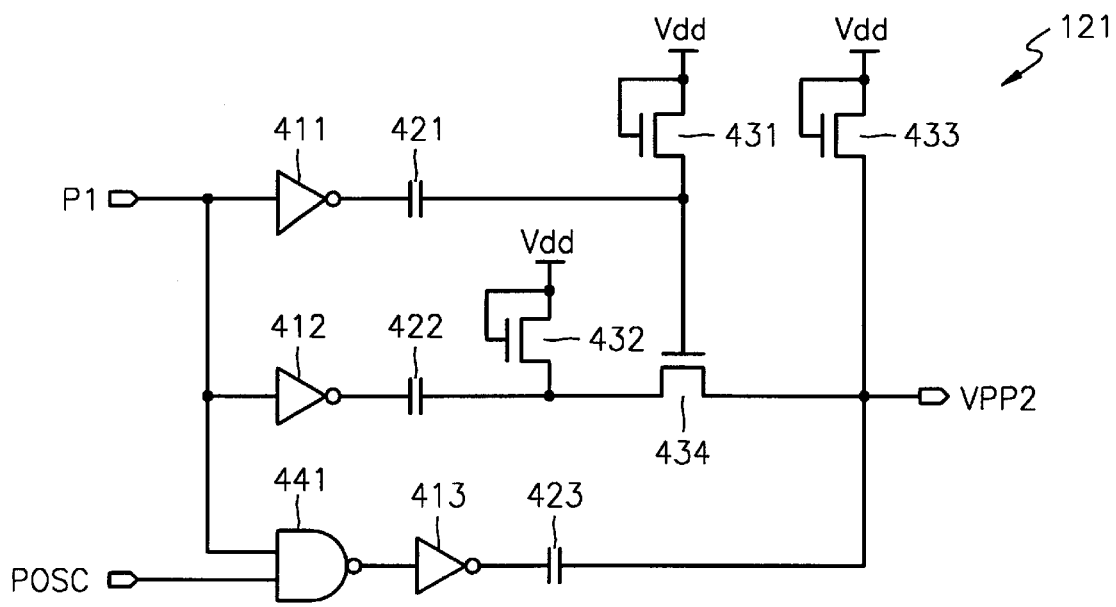
FIG. 4 is a circuit diagram of the second voltage pumping unit shown in FIG. 1.

FIG. 4 is a circuit diagram of the second voltage pumping unit 121 shown in FIG. 1. Referring to FIG. 4, the second voltage pumping unit 121 includes inverters 411 through 413, capacitors 421 through 423, NMOS transistors 431 through 434, and a NAND gate 441. Elements 411 to 413, 421 to 423, 431 to 434, and 441 operate in the same manner described above for elements 311 to 313, 321 to 323, 331 to 334, and 341 of FIG. 3. Since the operation of the second voltage pumping unit 121 is the same as the operation of the first voltage pumping unit 111, a description thereof is omitted.

Figure 5:
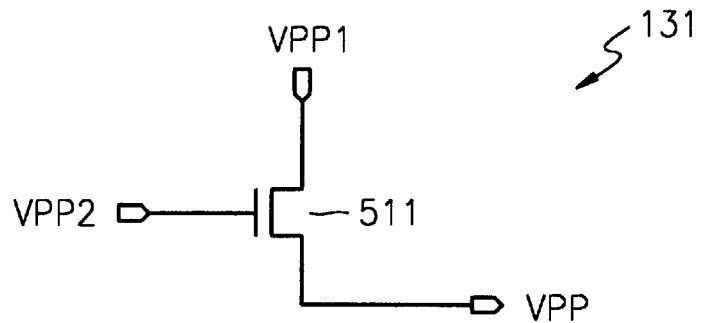
FIG. 5 is a circuit diagram of a voltage transmitting unit shown in FIG. 1.

FIG. 5 is a circuit diagram of the voltage transmitting unit 131 shown in FIG. 1. Referring to FIG. 5, the voltage transmitting unit 131 includes an NMOS transistor 511. The first voltage pumping unit 111 applies high voltage VPP1 to the drain of NMOS transistor 511. The second voltage pumping unit 121 applies high voltage VPP2 to the gate of NMOS transistor 511. The high voltage VPP, which is the outputted of charge pump circuit 100 via voltage transmitting unit 131, is output from the source of NMOS transistor 511. The voltage transmitting unit 131 outputs the first high voltage VPP1 minus the threshold voltage of transistor 511 as the high voltage VPP from the source of transistor 511 when both the first high voltage VPP1 and the second high voltage VPP2 are 3Vdd−2Vtn. Accordingly, the high voltage Vpp is about equal to 3Vdd−3Vtn.

Figure 6:
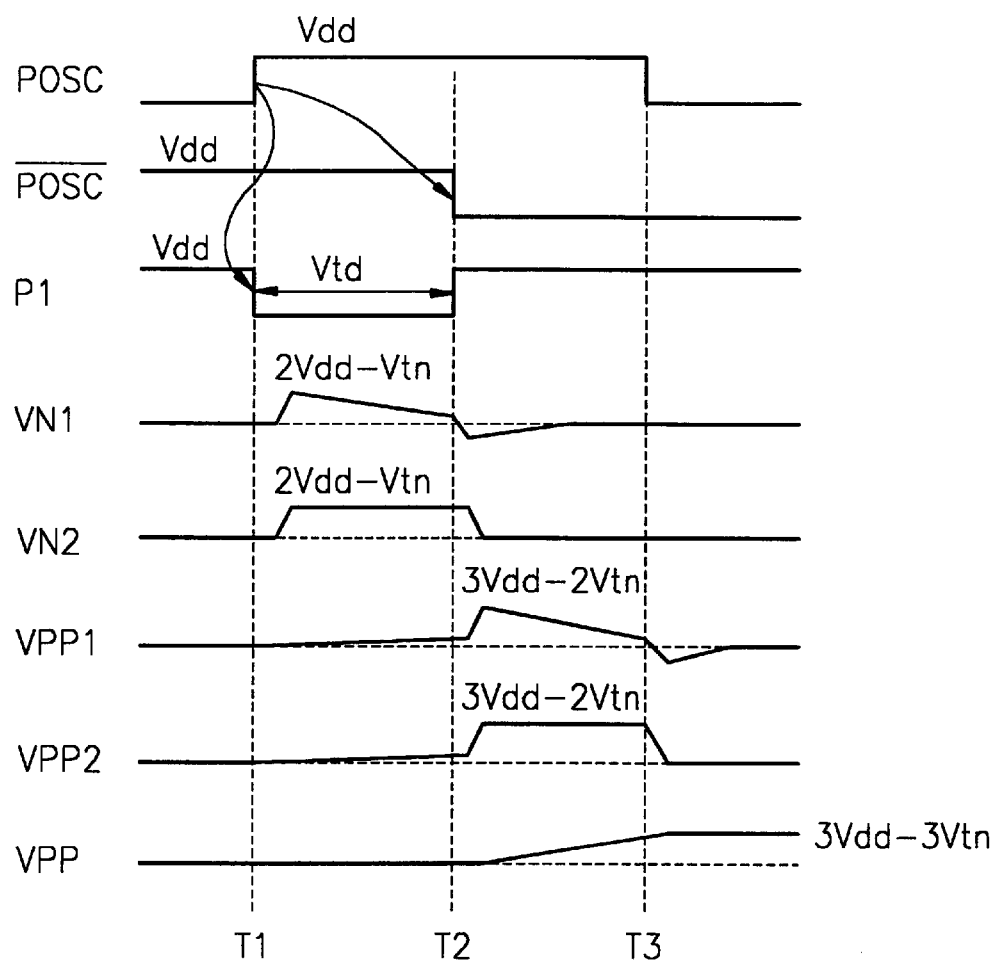
FIG. 6 shows waveforms of signals identified in FIG. 1.

FIG. 6 shows the waveforms of signals shown in FIGS. 1 to 5. Referring to FIG. 6, the operation of the voltage pumping circuit 100 shown in FIGS. 1 through 5 will be described. In the stand-by state, control signal POSC is at the logic low level, pulse signal P1 is at the logic high level, and nodes N1, N2, and N3 are precharged to Vdd−Vtn. When control signal POSC toggles to the logic high level at a time T1, pulse signal P1 toggles to a logic low level, and transistors 331, 332, 431, and 432 charge respective capacitors 321, 322, 421, and 422. Accordingly, the voltages at nodes N1 and N2 in voltage pumping units 111 and 121 increase to 2Vdd−Vtn. Since voltages VN1 from nodes N1 in voltage pumping units 111 and 112 are applied to the gates of respective NMOS transistor 334 and 434, transistors 334 and 434 transmit node voltage VN1 from nodes N2 to the nodes N3 with a loss of the threshold voltage Vtn of the NMOS transistor 334. Accordingly, the first high voltage VPP1 rises from Vdd−Vtn to 2Vdd−2Vtn. At a second time T2, the pulse signal P1 toggles from the logic low level back to the logic high level, and the node voltages VN1 and VN2 drop to the precharge voltage Vdd−Vtn. Since inverter 313 charges the capacitor 323 by the supply voltage Vdd, the first high voltage VPPI rises from 2Vdd−2Vtn to 3Vdd−2Vtn. At this time, since the second voltage pumping unit 121 performs the same operation as the first voltage pumping unit 111, the second high voltage VPP2 also rises to 3Vdd−2Vtn. Since the voltages applied to both the gate and the drain of the NMOS transistor 511 in the voltage transmitting unit 131 are 3Vdd−2Vtn, the first high voltage VPP1 is transmitted to the source of the NMOS transistor 511 with a loss due to the threshold voltage Vtn of the NMOS transistor 511. Therefore, at the third point in time T3, the high voltage VPP is 3Vdd−3Vtn.

The above-mentioned voltage pumping circuit 100 can provide a high voltage required for driving the semiconductor memory device, in particular, the word line driver, a bit line isolation circuit, and a data output buffer for the DRAM semiconductor device. Also, it is possible to provide the high voltage even when the external power supply voltage provided to the semiconductor memory device is low. According to the voltage pumping circuit 100 of the present invention, it is possible to obtain a high voltage VPP much higher than the external power supply voltage.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A voltage pumping circuit comprising:
    a pulse generator that generates a pulse signal in response to a control signal;
    a first voltage pumping unit that generates a first high voltage of a predetermined level in response to the control signal and the pulse signal;
    a second voltage pumping unit that generates a second high voltage in response to the control signal and the pulse signal; and
    a voltage transmitting unit that inputs the first high voltage and outputs the first high voltage when the second high voltage is applied.

2. The voltage pumping circuit of claim 1, wherein the pulse generator generates a pulse signal when the control signal is toggled from a first level to a second level.

3. The voltage pumping circuit of claim 2, wherein the pulse signal is a logic low level pulse signal.

4. The voltage pumping circuit of claim 1, wherein the first voltage pumping unit generates a third high voltage when the pulse signal is generated and the first high voltage which is higher than the third high voltage immediately after the pulse signal has disappeared.

5. The voltage pumping circuit of claim 4, wherein the first voltage pumping unit generates the first high voltage in a state in which the control signal is toggled from a first level to a second level and does not generate the first high voltage when the control signal is converted from the second level to the first level.

6. The voltage pumping circuit of claim 1, wherein the second voltage ping unit generates a fourth high voltage when the pulse signal is generated and the second high voltage which is higher than the fourth high voltage immediately after the pulse signal has disappeared.

7. The voltage pumping circuit of claim 1, wherein the voltage transmitting unit comprises an NMOS transistor.

8. The voltage pumping circuit of claim 1, wherein the voltage pumping circuit is used for a semiconductor memory device.

9. The voltage pumping circuit of claim 1, wherein the pulse generator comprises:
    a NAND gate; and
    an inverter chain comprising an odd-numbered plurality of inverters.

10. The voltage pumping circuit according to claim 1, wherein a level of the second high voltage is the same as the predetermined level.

11. The voltage pumping circuit according to claim 1, wherein a level of the second high voltage is different than the predetermined level.

12. A charge pump comprising:
    a first voltage pumping unit that generates a first high voltage that is higher than a supply voltage;
    a second voltage pumping unit that generates a second high voltage; and
    a voltage transmitting unit comprising an output transistor having a drain coupled to receive the first high voltage from the first voltage pumping unit and a gate coupled to receive the second high voltage from the second voltage pumping unit, wherein a source of the output transistor provides an output signal from the voltage transmitting unit,
    wherein each of the first and second voltage pumping units comprises:
    a first transistor having a drain coupled to the supply voltage, a gate coupled to the drain of the first transistor, and a source coupled to a first node;
    a first capacitance coupled to the first node;
    a first circuit element coupled to a side of the first capacitance opposite to the first node, wherein the first circuit element charges the first capacitance to the supply voltage in response to a first signal;
    a second transistor having a drain coupled to the supply voltage, a gate coupled to the drain of the second transistor, and a source coupled to a second node;
    a second capacitance coupled to the second node;
    a second circuit element coupled to a side of the second capacitance opposite to the second node, wherein the second circuit element charges the second capacitance to the supply voltage in response to the first signal;
    a third transistor having a drain coupled to the supply voltage, a gate coupled to the drain of the third transistor, and a source coupled to a third node;
    a third capacitance coupled to the third node;
    a third circuit element coupled to a side of the third capacitance opposite to the third node, wherein the third circuit element charges the third capacitance to the supply voltage in response to a second signal;
    a fourth transistor having a gate coupled to the first node, a drain coupled to the second node, and a source coupled to the third node.

13. The charge pump of claim 12, wherein the first, second, third, and fourth transistors are NMOS transistors.

14. The charge pump of claim 12, wherein each of the first, second, and third circuit elements comprises an inverter.

15. The charge pump of claim 12, wherein:
    during operation of the charge pump, the first signal is a pulse signal that periodically causes the first and second circuit elements to respectively charge the first and second capacitances; and the second signal causes the third circuit element to charge the third capacitance a delay time after the first and second circuit elements respectively charge the first and second capacitances.

16. The charge pump of claim 12, wherein:

the third node of the first voltage pumping unit is connected to the drain of the output transistor; and the third node of the second voltage pumping unit is connected to the gate of the output transistor.

17. A charge pump comprising:

a first voltage pumping unit that generates a first high voltage that is higher than a supply voltage;

a second voltage pumping unit that generates a second high voltage; and a voltage transmitting unit comprising an output transistor having a drain coupled to receive the first high voltage from the first voltage pumping unit and a gate coupled to receive the second high voltage from the second voltage pumping unit, wherein a source of the output transistor provides an output signal from the voltage transmitting unit, wherein each of the first and second voltage pumping units comprises:

a first transistor having a drain coupled to the supply voltage, a gate coupled to the drain of the first transistor, and a source coupled to a first node;

a first capacitance coupled to the first node;

a first circuit element coupled to a side of the first capacitance opposite to the first node, wherein the first circuit element charges the first capacitance to the supply voltage in response to a first signal;

a second transistor having a drain coupled to the supply voltage, a gate coupled to the drain of the second transistor, and a source coupled to a second node;

a second capacitance coupled to the second node;

a second circuit element coupled to a side of the second capacitance opposite to the second node, wherein the second circuit element charges the second capacitance to the supply voltage in response to the first signal;

a third capacitance coupled to a third node;

a third circuit element coupled to a side of the third capacitance opposite to the third node, wherein the third circuit element charges the third capacitance to the supply voltage in response to a second signal; and a third transistor having a gate coupled to the first node, a drain coupled to the second node, and a source coupled to the third node.

* * * * *